United States Patent [19]
Klein et al.

[11] 4,197,500
[45] Apr. 8, 1980

[54] AUTOMATIC CHANNEL SELECTION

[75] Inventors: Theodore J. Klein, Atlantic Highland; George E. Krause, Tinton Falls; Paul F. Sass, Englishtown, all of N.J.

[73] Assignee: The United States of America as represented by the Secretary of the Army, Washington, D.C.

[21] Appl. No.: 972,532

[22] Filed: Dec. 22, 1978

Related U.S. Application Data

[63] Continuation-in-part of Ser. No. 737,629, Nov. 1, 1976, abandoned.

[51] Int. Cl.[2] .............................................. H04B 17/00
[52] U.S. Cl. .......................................... 455/62; 455/67
[58] Field of Search ........................ 325/52, 55, 56, 63, 325/64, 65, 67; 340/146.1 BE

[56] References Cited
U.S. PATENT DOCUMENTS

| | | | |
|---|---|---|---|
| 3,160,813 | 12/1964 | Biggi et al. | 325/63 |
| 3,483,472 | 12/1969 | Kinkel | 325/63 |
| 3,983,492 | 9/1976 | Fisher | 325/63 |
| 4,013,962 | 3/1977 | Beseke | 325/56 |

*Primary Examiner*—Benedict V. Safourek
*Assistant Examiner*—Michael A. Masinick
*Attorney, Agent, or Firm*—Nathan Edelberg; Jeremiah G. Murray; Edward Goldberg

[57] ABSTRACT

HF and VHF radio channels which are subject to time-varying propagation anomalies and to interference are arranged in groups according to frequency band. Within each group are several channels, each spaced sufficiently close so that they experience essentially the same propagation. The several channels in each group are continuously measured to find which channels have the least ambient energy levels, then one of those channels is selected in a random manner to transmit data.

13 Claims, 8 Drawing Figures

ADAPTIVE THRESHOLD DETECTOR

AUTOMATIC CHANNEL SELECTION

GOVERNMENT LICENSE

The invention described herein may be manufactured and used by or for the Government for governmental purposes without the payment of any royalties thereon or therefor.

This application is a continuation-in-part of copending application Ser. No. 737,629, filed Nov. 1, 1976 and now abandoned.

BACKGROUND OF THE INVENTION (a) Field of the Invention

Broadly speaking, this invention relates to telecommunications. More particularly, in a preferred embodiment, this invention relates to methods and apparatus for automatically selecting the best one of n telecommunications channels.

(b) Discussion of the Prior Art

It is frequently necessary to establish a highly reliable telecommunications link over channels which are characterized by time-varying channel occupancy or uncertain communications support mechanisms. Heretofore, no really successful solution to this problem has been found except by the use of human operators located at both ends of the telecommunications link. However, in many instances, manning both ends of a communications link is undesirable and in some cases impossible, for example, when the far end of the link is in some inaccessible or dangerous location.

Related prior art apparatus include U.S. Pat. No. 3,160,813, issued Dec. 8, 1964, which utilizes a channel selection system wherein a transmitter and receiver sweep a frequency band in synchronism and the receiver registers the field intensity or signal-to-noise ratio to ascertain the frequency for which the received signal is the highest. The transmitter and receiver local oscillator then operate on that selected frequency. This requires synchronization between receiver and transmitter and prior communication to start the scans simultaneously and then relies on the strongest signal level to identify the best channel. Noise or interference can defeat this technique. Another system shown in U.S. Pat. No. 3,983,492, issued Sept. 28, 1976, also searches for the strongest received signal. A microprocessor and logic circuit, frequency synthesizer, tunable receiver and voltage comparator are used to determine the strongest signal.

The technique disclosed in the present application was originally conceived as a solution to the problem of achieving extreme reliability in a system which relied on both high frequency and very high frequency radio propagation to provide communications over difficult terrain. Since spectrum occupancy and propagation conditions on these frequency bands are extremely time varying, high reliability cannot be achieved by conventional single frequency communications. Of course, one skilled in the art will appreciate that the invention is not limited to radio communications but may be used with equal success on any transmission facility which is subject to varying transmission quality.

The technique disclosed herein provides a solution to the two main problems which are characteristic of the HF and VHF radio bands. Communications via HF skywave, necessary to achieve coverage over long distances or in mountainous terrain, is subject to propagation anomalies which are severely time varying and dependent on the time of day, the month, the season of the year and current sunspot activity. These variations prevent HF radio from providing reliable signal support on any one preselected frequency, since different frequencies are affected to varying degrees and at varying times by these phenomena. For example, frequencies which are suitable for night use are usually unsuitable during daylight, and vice versa. Communications at or above VHF are generally more stable in that they are subject to fewer propagation variations and, therefore, provide inherently more reliable communications. They are, however, subject to terrain masking. On the other hand, spectrum occupancy in both of these bands is severe and interference caused by noise and other users also prevents reliable links from being continuously available on any one frequency.

It is therefore acknowledged that a choice of alternate operating frequencies is not only desirable, but essential to highly reliable communication links at HF and VHF, as well as in other crowded portions of the spectrum. As discussed, since manned operation at both ends of the link is in many instances not only undesirable, but impossible, a means of automatically selecting satisfactory frequencies is required.

It is the intent of this disclosure to define a general system which is applicable to any communication medium which provides the user with a number of alternative channels for communication in an effort to automatically assure the availability of a high quality link. The discussion is generalized so as to apply equally well to HF and VHF, as well as to other frequency ranges or channels of interest.

SUMMARY OF THE INVENTION

The key to reliable operation on any crowded radio frequency band is often the identification of a potentially "usable" frequency (channel). Due to the markedly different characteristics of HF and VHF radio channels, identification of a "usable" frequency is somewhat difficult. For the time being, a "usable" channel should be interpreted as being a channel relatively free of interference, either friendly or unfriendly, and of sufficient quality to support error-free transmission of data. Therefore, although the determination of a "usable" frequency can be made beforehand, an actual measure of channel quality is also required before data transmission is attempted.

The system disclosed and claimed herein therefore utilizes in all cases a known channel test message which is transmitted prior to the data transmission to assure a sufficient level of quality. The automatic channel ordering before transmission utilizes information which is available before transmission, and therefore, provides a better basis for trials, assuring significantly shorter transmission time, on the average, than random "trial and error" transmissions. Reductions in transmission time present advantages in terms of the immunity of an enemy to intercept, as well as savings in power. Thus, another important advantage of this system is that it is normally in a "quiet" state, requiring very little power and emitting no radiation. In addition, the disclosed technique permits unmanned operation at both ends of the link, since all channel ordering and test transmission is automatic. The remote site requires no operating personnel after the initial installation. System operation is asynchronous, with no prior knowledge required at the remote site, other than a programmed list of possible operating frequencies and a knowledge of the signal formats to enable the use of digital correlation techniques for both the test message and actual data.

More specifically, the system described and claimed herein relies on the choice of not one operating frequency channel but on a set of possible operating frequencies distributed across the bands of interest. Before message transmission is attempted, a survey is automatically made of the entire channel set, and a determination of the "best" channel is made. Once this determination is made, operation, when desired, proceeds on the "best" channel. Choice of the "best" channel however can be made in a number of ways, and is discussed in more detail below.

The invention and its mode of operation will be more fully comprehended from the following detailed description when taken with the appended drawings, in which:

DESCRIPTION OF THE DRAWINGS

FIG. 2b is a block schematic of an illustrative microprocessor for use in the apparatus of FIG. 2a;

FIG. 3a is a block schematic of an illustrative adaptive threshold detector for use in the apparatus of FIG. 2a;

FIG. 3b is a block schematic of an illustrative validation circuitry for use in the apparatus of FIG. 2a;

DETAILED DESCRIPTION OF THE PREFERRED EMBODIMENTS

When a number of channels are available for the transmission of a message, the total time for message delivery can be reduced considerably if the "best" channels can be selected and tried first, rather than by using a random trial and error procedure. Both embodiments of the invention to be discussed below have provisions for monitoring the steady-state or ambient energy level in each channel. What is needed is a criterion for ordering the channels to determine the sequence of trials. On time invarient channels typical of above-VHF radio, it would appear that the quietest or lowest ambient energy channel would be the best, and the channels should be ordered on this basis. This criterion leads, however, to a possible ambiguity at HF since the quietest channel may merely indicate a channel with no signal support mechanism.

Figure 1:
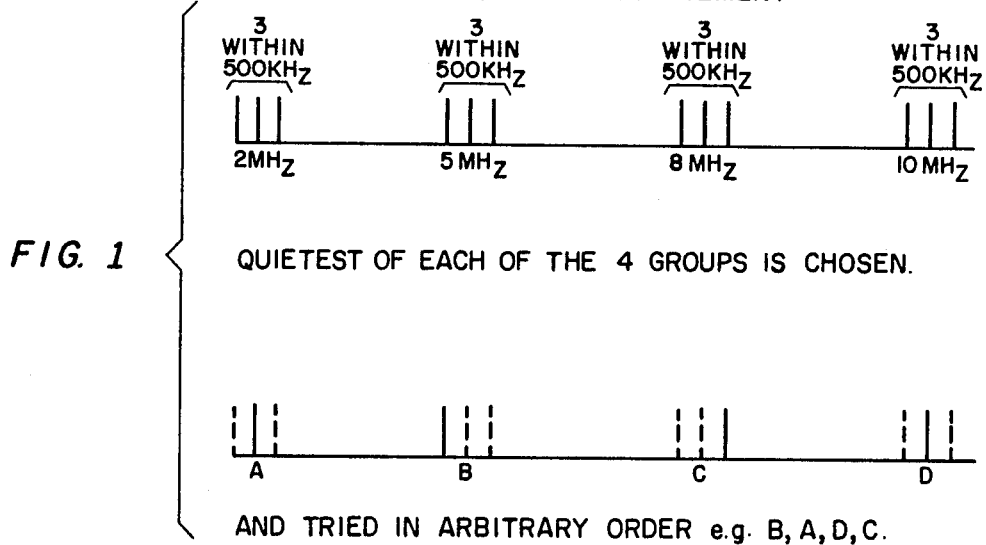
FIG. 1 is a spectrum diagram illustrating the manner in which radio frequency channels are grouped and tested for possible use according to the invention.

Another criterion for determining the "best" channel is, therefore, disclosed herein and this criterion is effective at both VHF and HF. More specifically, if channels at HF are grouped as shown in FIG. 1, with several channels located within several hundred kilohertz of each other, these channels would each receive similar ionospheric support. Thus, a set of channels (at HF) consisting of the quietest channel from each group would be certain to include the "best" channel. If these channels are tried in an arbitrary order, one would be assured of trying the best channel in a fewer number of tries than by routinely testing every channel in each group. Since the ordering of those channels tried is arbitrary or random, one may assume the best channel is equally likely to be chosen on each try.

Assuming an HF repertoire of 12 frequencies arranged in four groups of three, as in FIG. 1, the quietest of each of the four groups, tried randomly, will on the average result in the best overall frequency being among the first two tried. Average transmission time is, therefore, reduced by a factor of three.

Operation of the proposed system will be described from the point of view of a symmetrical two-way radio link, each end being capable of operation on a number of frequencies, n. It should be stressed that the resultant reliability of this technique depends both on the number and the frequency of the channel choices. These parameters must be selected on the basis of expected propagation conditions or channel occupancy, in such a way as to provide sufficient overall reliability.

Figure 2A:
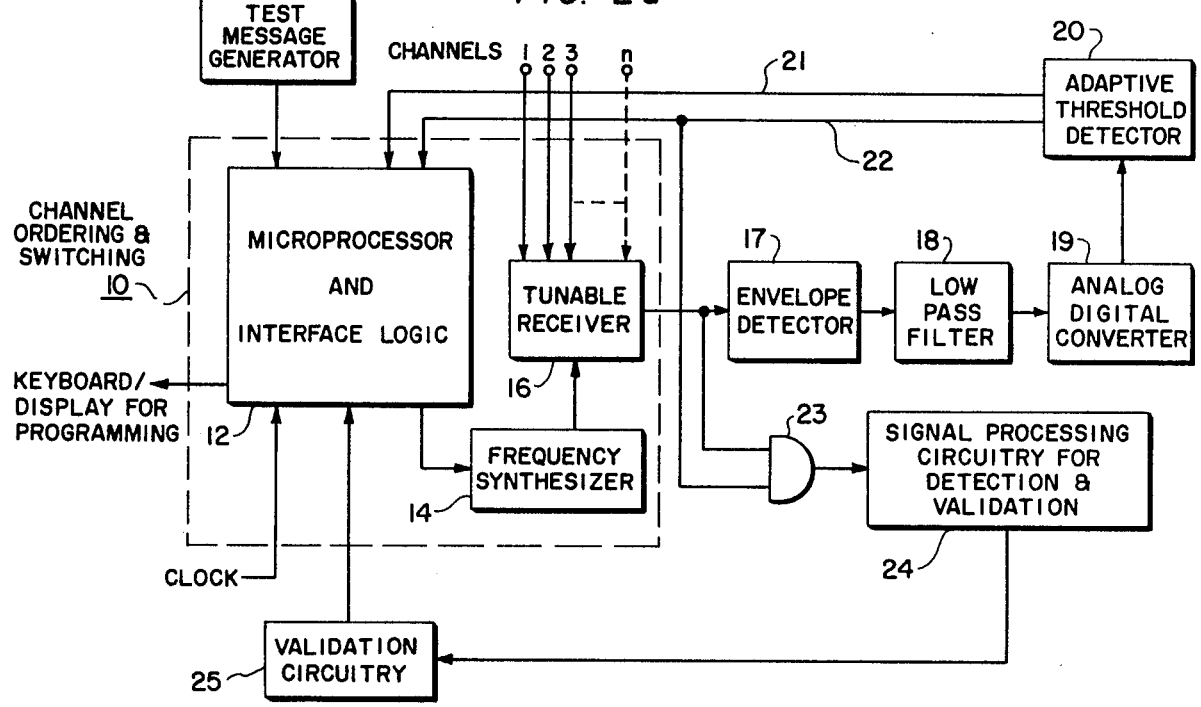
FIG. 2a is a block schematic diagram of an illustrative channel selection apparatus according to the invention.

FIG. 2a depicts an embodiment of the basic system. As shown, n channel inputs are connected to a channel ordering and switching block 10 which includes a microprocessor and interface logic device 12, a frequency synthesizer 14 and a tunable receiver 16. The output of the tunable receiver is connected to an envelope detector 17, thence to an analog-to-digital converter 19 via a low-pass filter 18. The output of the A/D converter, in turn, is connected to the input of an adaptive threshold detector 20, to be discussed in more detail below. Control leads 21 and 22 connect the threshold detector to the microprocessor and interface logic device. The outputs of the tunable receiver 16 and control lead 22 are connected to the inputs of an AND-gate 23 which is connected to signal processing circuit 24 representing a utilization device or output means which processes the output signal for a particular application.

Figure 2B:
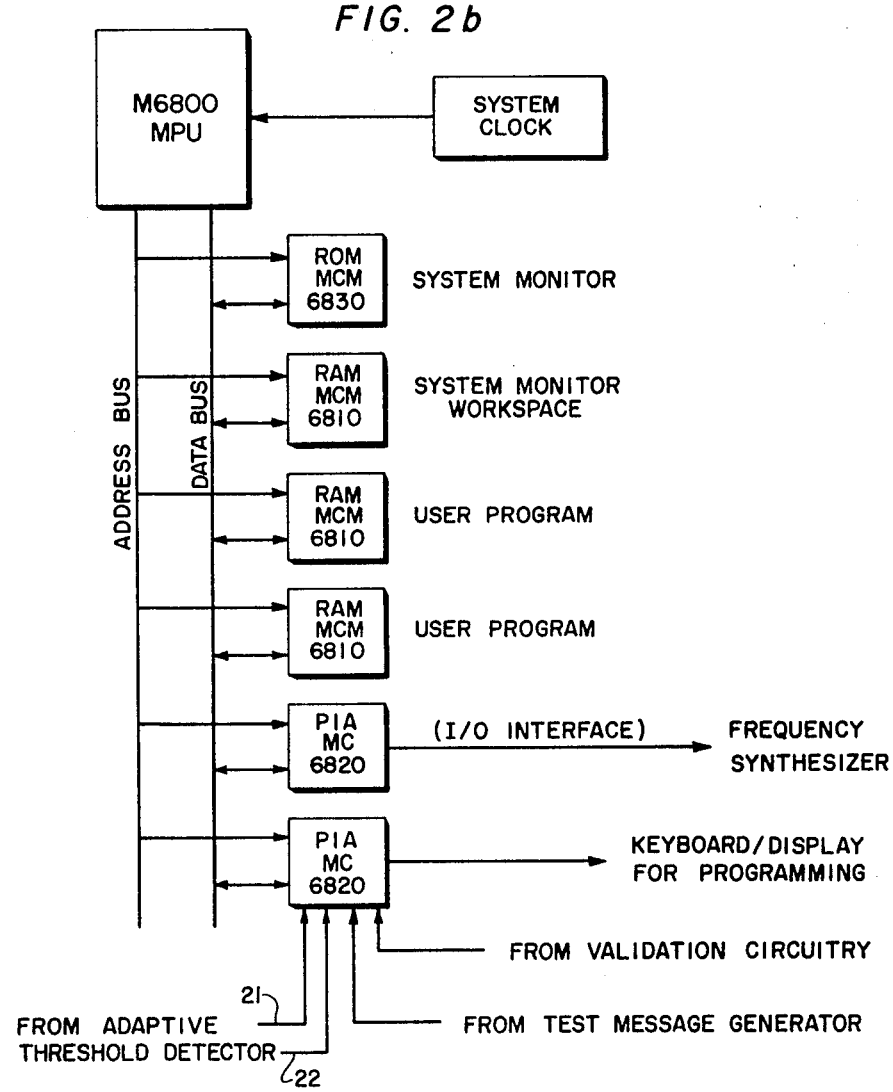

The channel ordering and switching operation of the microprocessor produces a sequential set of channel samples, in order of increasing ambient energy levels as measured by the adaptive threshold detector 20. Before the channels can be ordered, the energy of each channel is measured. This is accomplished by a sequential scan of all channels under control of the microprocessor to load a full set of energy measurements into the adaptive threshold detector. Selection of a suitable microprocessor to accomplish the necessary operations is a matter of design to obtain proper timing, sequencing of a number of programming steps and association of particular memory locations within the microprocessor with particular variables. A representative microprocessor that may be used is shown in FIG. 2b which illustrates a Motorola M6800 type unit. The term ROM signifies-read only memory, RAM is-random access memory, and PIA represents-peripheral interface adapter. These are standard designations for conventional commercially available items. Three types of memories are utilized within the microprocessor including a lookup table memory A sufficient to contain n code words, one code word for each of n channels; a measurement memory B sufficient for n digital measurements, each representing the ambient energy level of one channel; and an order memory C for n digital code words representing the n channels to be tried in order of increasing ambient energy level.

The microprocessor accepts as an input signal level measurements from line 21 in addressed locations for each of the channels measured. These values are already stored in shift register 26 of detector 20, FIG. 3a, and are readily transferred to the microprocessor. A one by one comparison of the channel measurements implemented in the microprocessor results in an output digital word representing the next channel to be tried which is formatted by the interface logic to control the frequency synthesizer. In another variation, where n channels represent a number of multichannel circuits arriving at a single point, the microprocessor would simply control an n position programmable digital switch, instead of a frequency synthesizer-receiver combination.

Figure 2C:
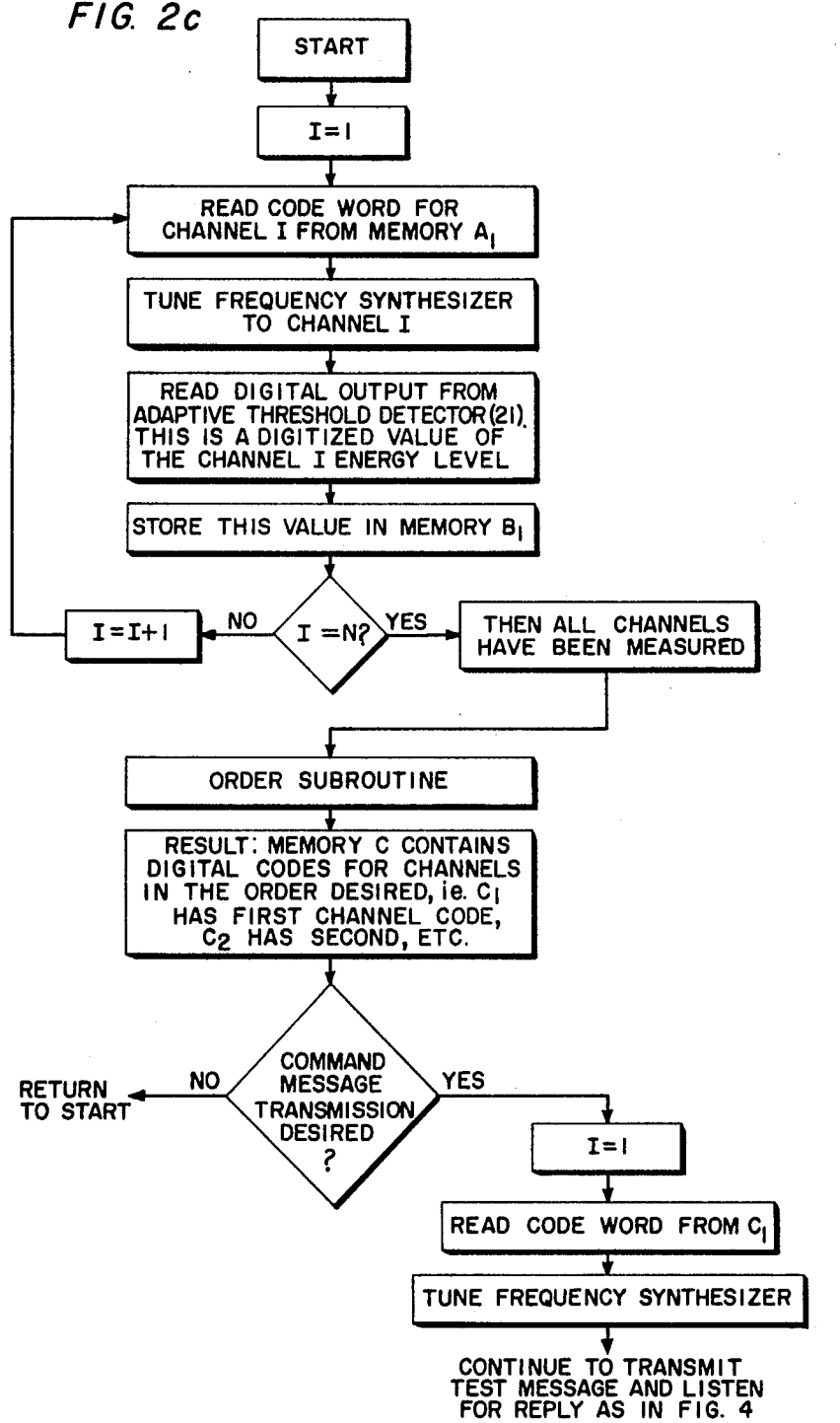
FIG. 2c is a flow chart indicating the operation of the microprocessor channel ordering and switching.

Following the flow chart of FIG. 2c, the first step of the channel ordering and switching operation is to read the code for channel 1 from memory A and tune the synthesizer to channel 1. When tuned to channel 1, output 21 of the adaptive threshold detector 20 is loaded into memory B. Since all channels haven't yet been measured, the microprocessor selects the next code word from memory A and loads the next measured value into memory B. It then proceeds to load measurements of succeeding channels into locations in memory B. When finished, the measurement memory B contains measured energy levels of all channels. The microprocessor now proceeds to order these stored values.

The first step in the ordering subroutine is to compare the first and second measured values in memory B. The smaller of the two is selected and compared in a successive pairwise fashion until the smallest (Bm) of all the measurements in memory B is known. Since the memory location of this smallest value also indicates the channel number (m) from which it was taken, the microprocessor looks up the code for that channel from lookup table memory A and stores that code word in the first location of order memory C. That will be the first channel to be used for test transmission. Since ordering has not yet been completed, pairwise comparison of the remaining measurements resumes to obtain the next smallest value.

Finally, after all measurement memory B locations have been ordered, order memory C contains code words for the n channels to be tried, in the order of increasing ambient noise level.

The switching operation is then begun, in which the microprocessor reads code words from the memory locations in memory C, providing to the frequency synthesizer the code words necessary to select specific channels.

In the arrangement shown in FIG. 2a, system operation depends on the availability of independent samples of each channel. The channels represent n possible frequency slots in a radio communication system wherein the synthesizer, under control of the microprocessor, tunes the receiver to each channel. The synthesizer provides a local oscillator signal for each channel to a mixer in the receiver. The receiver includes appropriate RF and IF stages that translate all frequency slots to a common IF frequency. Once this IF is established, the n channels are equivalent to any n channels, and could equally originate from a wire multichannel switch or any other radio propagation mechanism.

In operation, once the channel samples are available at a common intermediate frequency, the envelope detector 17 and low-pass filter 18 measure the quiescent or ambient energy level on each channel. The outputs of low-pass filter 18 are then A/D converted, and further processing of the control signals is digital. Digital energy levels are next entered into adaptive threshold detector 20 which is shown in greater detail in FIG. 3a. The adaptive threshold detector uses a time-multiplexed (n-word) digital filter with a much longer time constant than low-pass filter 18 and is therefore termed a very-low-pass filter.

Figure 3A:
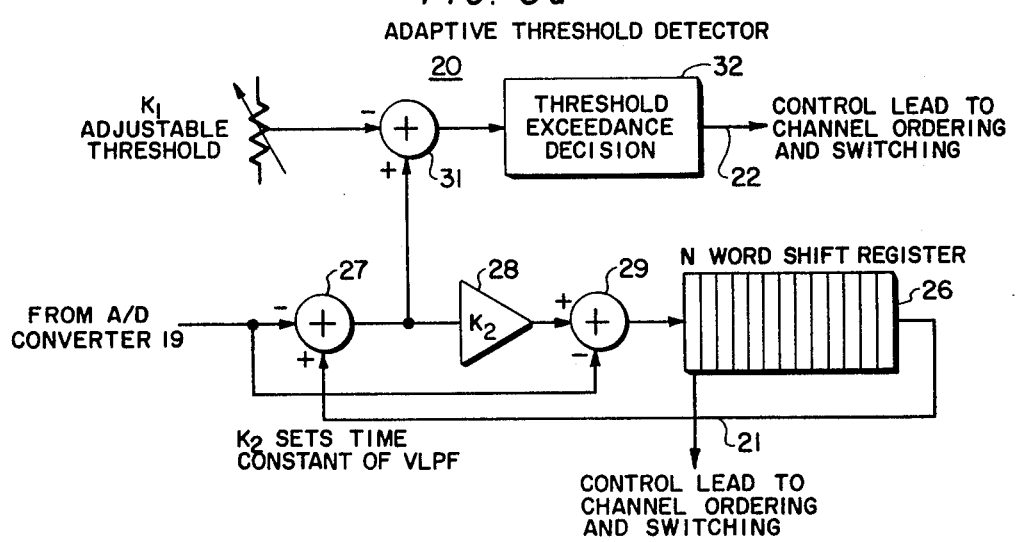

As shown in FIG. 3a, the detector 20 comprises an n-word shift register 26. The output of A/D converter 19 is subtracted from the output of register 26, in a subtractor 27. The output of subtractor 27, in turn, is connected to an amplifier 28 of gain $K_2$, thence to a second subtractor 29 which also receives the output of A/D converter 19.

The output of subtractor 27 also forms one input to a third subtractor 31 whose other input is an adjustable threshold potential $K_1$. The output of subtractor 31 is connected to a threshold exceedance decision circuit 32 whose output, via control lead 22, controls the microprocessor switching mechanism. Circuit 32 represents a comparator which provides an output when the signal from 27 exceeds the threshold. The output of the first stage of shift register 26 forms the signal on control lead 21 to control the microprocessor channel ordering.

The short time constant of the low-pass filter 18 provides a short term average energy measure on each of the n channels. The very-low-pass filter (detector 20) has a significantly longer time constant and provides an ambient, long term average energy measure for each channel which is stored separately in each stage of the shift register. The different time constants of the two filters enable the system to detect the transient caused by the arrival of a signal in one of the n channels. Each of the n channels will, therefore, have its own adaptive threshold maintained in one stage of the very-low-pass filter. The arrangement of the two filters enable adaption of the digital signal level measurement to compensate automatically for time varying interference on each separate channel, to permit detection of signal arrival on any one channel. This avoids the need for receiver/transmitter synchronism.

As discussed, two control signals are provided by the adaptive threshold detector 20. One, on lead 22, is a binary signal which indicates threshold exceedances for each channel. The other, on lead 21, is the actual digitized energy level of each channel. This information is used to order the channels, as discussed previously.

Figure 3B:
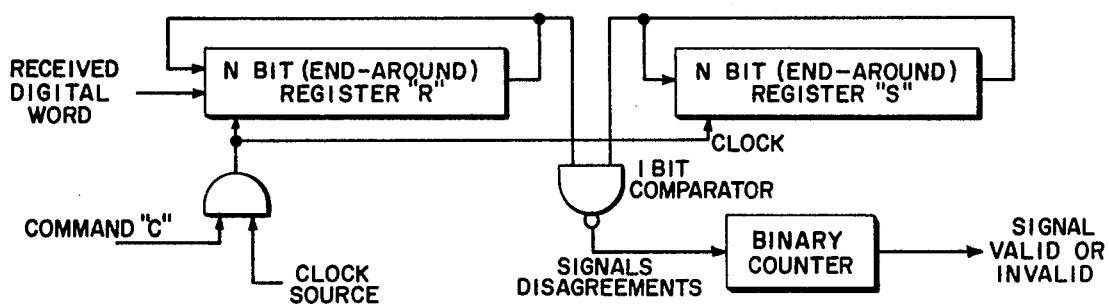

The microprocessor channel switching mechanism, upon command of the threshold exceedance decision circuitry 32, selects one of the n channels for further processing by signal detector circuitry. This depends totally on the signal modulation and formats and is application dependent. Should subsequent processing and authentication determine that the signal was not a valid one, the channel switching mechanism would resume its "scanning" operation. A validation circuit 25 is connected to the microprocessor and to output signal processing circuit 24 for the purpose of analyzing a received digital channel test message which is compared with a locally stored version of that message to confirm its authenticity. FIG. 3b shows a representative circuit that can be used for this purpose. The N-bit received digital word can be stored in register R and cycled upon command C into a one bit comparator NAND gate simultaneously with the N-bit stored message from register S. Depending upon a predetermined disagreement count, a validity signal is then provided.

Equipment deployment is envisioned as comprising two units, a manned "command" unit and an unmanned "remote" unit. The invention does not, however, require operators at either site, since all functions are automatic, and could readily be applied to a situation where message transmission was initiated automatically at the command site. Installation procedures and the types of message transmitted depend on the specific application and are not discussed. This channel selection technique is applicable whether data is generated at the command or remote units, and therefore each case is described separately.

CASE 1: DATA SOURCE AT COMMAND UNIT

This application requires the transmission of a data message from the command to the remote unit with high reliability. After the remote unit has been installed, it lies quietly in the field, monitoring each of the possible operating frequencies. This requires very little power and, therefore, is consistent with portable battery constraints. The command unit, similarly, is left in a quiet condition, continuously making a determination of the usefulness of each of the possible operating frequencies. This determination results in a continuously updated order of usefulness which dictates which frequency is currently considered the "best".

Figure 4:
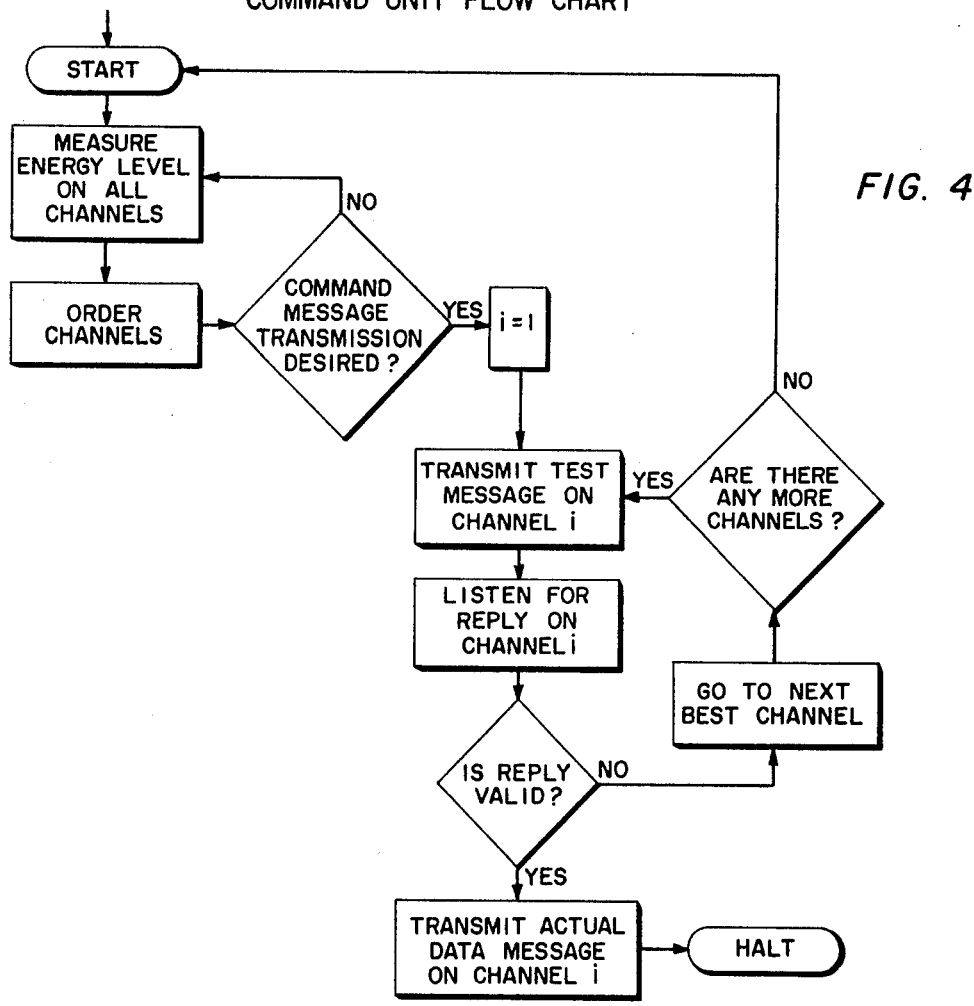
FIG. 4 is a flow chart indicating the operation of the system when data is transmitted from the remote location to the command location.

When message transmission is desired at the command unit, action is initiated which results in a series of events, as described in the flow diagram of FIG. 4. More specifically, the adaptive ordering is frozen, and a channel test message is transmitted on the "best" channel. The remote unit, unaware of which frequency the command unit has selected, monitors all frequencies, and looks for a sudden increase in signal levels on one of its channels. When this energy increase is detected, timing acquisition and message detection and authentication are attempted. In the event that the message is not authentic, continuous channel monitoring is resumed. If the received message is verified, the remote unit locks on the frequency on which it received the test message, and transmits a reply message. It then awaits reception of the real command message on the same channel. Upon receipt of the remote unit's reply message, indicating a channel of sufficient quality, the command unit proceeds to transmit the actual command message on the same channel. Should a reply not be received, the command unit assumes its "best" channel is no longer suitable, and proceeds to try the next in its order.

CASE 2: COMMAND UNIT INTERROGATES REMOTE UNIT, WHICH MUST TRANSMIT ACTUAL DATA

Applications such as this are useful in the remote interrogations of passive sensors which have been implanted in the field to collect data. The technique provides the useful capability of interrogating sensors in inaccessible locations, and would prove extremely useful in areas with high tactical VHF activity.

Figure 5:
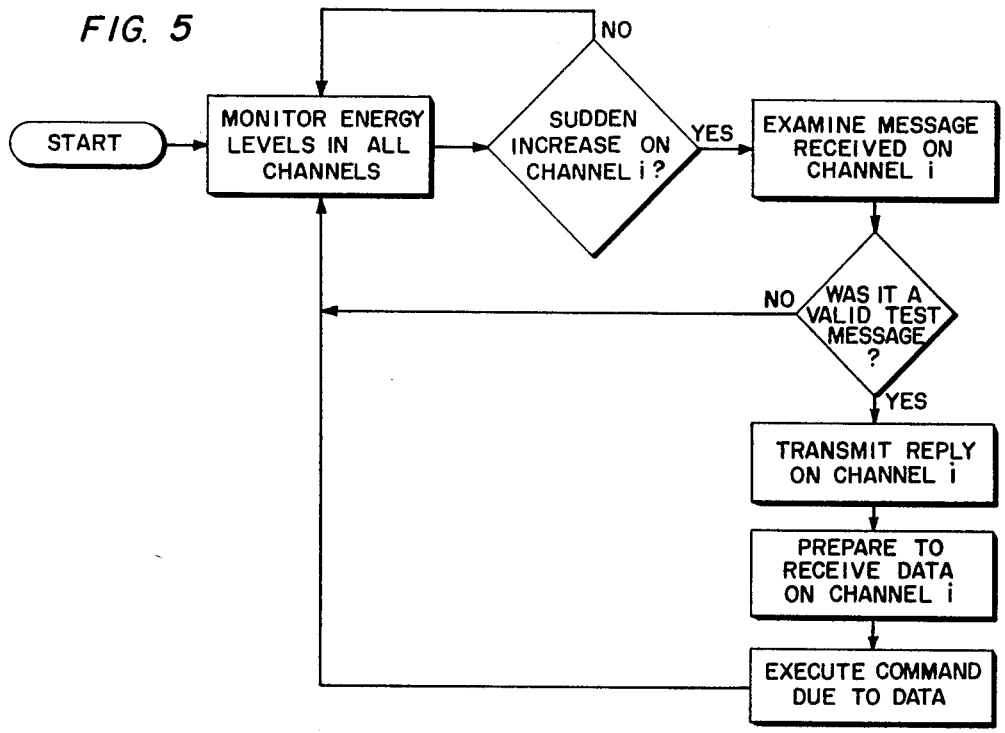
FIG. 5 is a flow chart indicating the operation of the system when data is transmitted from the command location to the remote location.

Message transmission is in this case also initiated at the command unit, with remote unit operations shown in FIG. 5. Here, the only message transmitted by the command unit is a channel test message to measure quality, which is sent on the "best" channel. Reception and authentication of this message at the remote unit, in this case, elicits not a reply message, but a transmission of the actual data message on the same channel. Should this not be successfully received at the command unit, the command unit assumes the channel quality was poor, and a channel test message is transmitted on the next "best" frequency, until reception is achieved. The remote unit would not, of course, transmit its data until a test message was received and authenticated, indicating a valid request and identifying a good channel.

In both the above-discussed cases, proper selection of the format of the channel test message is essential, in order to provide a valid measure of channel quality. There is no point in locating a channel of sufficient quality for the test message if that quality is not good enough for error-free reception of the actual data. In most cases, this dictates that the signal energy per bit for the test message must be essentially equal to that of the actual data.

One skilled in the art may make various changes and substitutions in the configuration shown without departing from the spirit and scope of the invention as set forth in the appended claims.

What is claimed is:

1. In a communication system of a type that includes n channels each of which is subject to propagation anomalies and/or interference, said channels being arranged into m groups of p channels each, wherein $n = m \times p$, a method of selecting a channel for the transmission of a data signal between near and far ends of a communications link, said channel having characteristics which maximize the probability of successful transmission of data, comprising the steps of:
   (a) at the near end of said transmission system, continuously measuring the ambient energy levels of each of the p channels in the first one of said m groups to determine which of said p channels has the least ambient energy level;
   (b) re-iterating said measuring step for each of the remaining (m-1) groups;
   (c) selecting a given one of said channels with the least ambient energy levels as the most likely channel to maximize the probability of successful data transmission; and then
   (d) transmitting a test message to the far end of said system over said selected channel.

2. The method according to claim 1 comprising the further steps of:
   (e) at the far end of the system, verifying that said test message is authentic and has been properly received; and then
   (f) transmitting a reply signal to the near end of the system which is indicative of the results of said verifying step.

3. The method according to claim 2 comprising the further steps of:
   (g) monitoring said selected channel at the near end for said reply signal, reception of said reply signal indicating satisfactory reception of said test signal at the far end of the system; and then
   (h) transmitting said data signal to said far end of the system over said selected channel.

4. The method according to claim 3 comprising the further steps of:
   (i) at the near end of the system, monitoring said selected channel for said reply signal and if not received;
   (j) selecting another one of said least ambient energy level channels; and then
   (k) re-iterating steps (d) through (h) above.

5. The method according to claim 2 wherein said verifying steps comprises:

(l) monitoring the energy level received at the far end of the system on all n channels;

(m) detecting which of said n channels is the channel corresponding to the selected channel at the near end of the system by virtue of a sudden increase of the energy level monitored on said channel;

(n) comparing the incoming test signal on said channel with a locally stored version of said test signal and, if said comparison results in agreement;

(o) generating said reply signal and applying same to said channel for transmission to the near end of the system.

6. The method according to claim 1 comprising the further steps of:

(p) transmitting a test message to the far end of said system over said selected channel;

(q) at the far end of the system, verifying that the test message is authentic and has been properly received; and then (r) transmitting said data signal to the near end of the system.

7. The method according to claim 6 comprising the further steps of:

(s) monitoring said selected channel for said data signal and, if said data signal is not successfully received;

(t) selecting another one of said least ambient energy level channels; and then (u) re-iterating steps (p) through (r) above.

8. The method according to claim 6 wherein said verifying step comprises:

(v) monitoring the energy level received at the far end of the system on all n channels;

(w) detecting which of said n channels is the channel corresponding to the selected channel at the near end of the system by virtue of a sudden increase in the energy level monitored on said channel;

(x) comparing the incoming test signal on said channel with a locally stored version of said test signal and, if said comparison is substantially identical;

(y) transmitting said data signal to the near end of the system over said channel.

9. In a transmission system of a kind that includes n channels each of which is subject to propagation anomalies and interference, said channels being arranged into m groups of p channels each, wherein n=m ×p, apparatus for selecting a channel for the transmission of a data signal between near and far ends of a telecommunication link, said channel having characteristics which maximize the probability of successful data transmission, which comprises:

means for supplying input signals to each of said n channels;

means for continuously measuring the ambient energy levels of each of said channels;

means for continuously selecting within each of said m groups, the channel having the least ambient energy level and for randomly selecting one channel from the m channels having the least energy levels; and means for transmitting a test signal to the far end of the system over said one selected channel.

10. The apparatus according to claim 9 wherein each of said m groups occupies a different segment of the frequency spectrum and each of the p channels in each group is separated from the other channels in the same group by no more than several hundred kilohertz.

11. The apparatus according to claim 9 wherein said measuring means comprises:

an envelope detector circuit;

a low-pass filter connected to said envelope detector;

an analog-to-digital converter connected to said low-pass filter; and an adaptive threshold detector connected to said analog-to-digital converter for averaging and storing the ambient energy levels in digital form of each said channels.

12. The apparatus according to claim 11 wherein said adaptive threshold detector comprises a very-low-pass digital filter including:

an n-word shift register for storing the ambient energy measurements made on each of the n-channels in said system and supplying said measurements to said channel selecting means; and a threshold exceedance decision circuit connected to said analog-to-digital converter for measuring a signal exceeding a given ambient energy level, the output of said threshold exceedance circuit being connected to said channel selection means.

13. The apparatus according to claim 12 further including:

means for validating a data signal received from said far end.

* * * * *